United States Patent [19]

Fudge

[11] Patent Number: 4,622,347

[45] Date of Patent: Nov. 11, 1986

[54] EXPANDABLE POLYPROPYLENE INTERPOLYMER PARTICLES

[75] Inventor: Kent D. Fudge, Glen Mills, Pa.

[73] Assignee: Atlantic Richfield Company, Los Angeles, Calif.

[21] Appl. No.: 848,560

[22] Filed: Apr. 7, 1986

[51] Int. Cl.$^4$ .............................. C08J 9/18; C08J 9/22
[52] U.S. Cl. ........................................ 521/81; 521/56; 521/59; 521/60; 521/79; 521/139; 264/53
[58] Field of Search ....................... 521/79, 81, 59, 60, 521/139

[56] References Cited

U.S. PATENT DOCUMENTS

| | | | |
|---|---|---|---|
| 3,144,436 | 8/1964 | Greene et al. ..................... | 525/387 |
| 3,743,611 | 7/1973 | Muroi et al. ......................... | 521/60 |
| 3,959,189 | 5/1976 | Kitamori ............................... | 521/60 |
| 4,168,353 | 9/1979 | Kitamori ............................... | 521/60 |
| 4,303,756 | 12/1981 | Kajimura et al. ..................... | 521/60 |
| 4,303,757 | 12/1981 | Kajimura et al. ..................... | 521/60 |
| 4,429,059 | 1/1984 | Ozutsumi et al. .................... | 521/60 |

*Primary Examiner*—Morton Foelak
*Attorney, Agent, or Firm*—Lewis J. Young

[57] ABSTRACT

A process for producing a polypropylenepolystyrene interpolymer which can be impregnated with a blowing agent and can then be expanded under normal conditions for polystyrene particles to low density, fine cell structure foams. The interpolymer must be viscbroken, lubricated and stress relaxed in order to foam at 100° C. to densities less than 2.0 pcf.

12 Claims, No Drawings

EXPANDABLE POLYPROPYLENE INTERPOLYMER PARTICLES

BACKGROUND OF THE INVENTION

The field of the present invention is the production of expandable thermoplastic resin particles which can be expanded under low temperature conditions to form fine cell structure foams of density lower than 2.0 pcf.

Polypropylene particles tend to lose blowing agent rapidly after impregnation. U.S. Pat. No. 4,303,756 describes a process for producing polypropylene-polyvinyl aromatic monomer interpolymers which can be impregnated and retain the blowing agent for sufficient time to allow expansion. However, these interpolymers cannot be foamed at temperatures of 100° C. normally used to foam thermoplastic resins. U.S. Pat. No. 3,144,436 teaches to viscbreak polypropylene polymers to lower molecular weight polymers by extruding the polymers with a peroxide in the absence of oxygen.

SUMMARY OF THE INVENTION

I have now found that certain interpolymers of polypropylene and polyvinyl aromatic monomers, when viscbroken to melt flow (condition L) greater than 10 in the presence of a lubricant and cell control additive, under conditions to give minimum orientation stress in the viscbroken product, can be impregnated with a blowing agent to give a product which can be expanded under low temperature (100° C.) conditions to give low density, fine cell structure foam particles.

DETAILED DESCRIPTION OF THE INVENTION

The process of this invention comprises
(a) suspending in an aqueous medium, a copolymer of propylene and sufficient olefin comonomers to give said copolymer a melting peak of less than 140° C., with the aid of a suitable suspending agent system;
(b) adding to said suspension vinyl aromatic monomer and a catalyst system such that the amount of monomer is 40 to 80% by weight based on copolymer plus monomer;
(c) polymerizing said monomer in the interior of said copolymer to form a polypropylene-polyvinylaromatic monomer interpolymer;
(d) separating said interpolymer from said suspension by acidifying, filtering, washing with water and drying in air;
(e) extruding said interpolymer in admixture with a lubricant and cell control agent and a peroxide, if used, to viscbreak said interpolymer to a melt flow (condition L) of at least 10, under conditions to minimize orientation stress in the final extrudate;
(f) impregnating said extrudate with a blowing agent to give expandable polypropylene-polyvinyl aromatic monomer interpolymers which can be expanded at 100° C. to fine cell structure foams of density less than 2.0 pounds per cubic foot.

The preparation of the interpolymer may be carried out according to U.S. Pat. No. 4,303,756 which is hereby incorporated in its entirety into the present application.

Particles is used herein to designate beads, pellets, or comminuted pieces.

The propylene copolymer used as base for the interpolymer must contain sufficient olefin comonomers to give said copolymer a melting peak of less than 140° C., preferably less than 130° C.

The olefin comonomers in the propylene copolymer may be ethylene, 1-butene or mixtures thereof. The melting peak is measured by Differential Scanning Calorimeter (DSC) by ASTM method D3418-82 at a heating rate of 20° C./min.

The suspending agent system is selected from water soluble high molecular weight materials, e.g., polyvinyl alcohol or methyl cellulose and slightly water soluble inorganic materials, e.g., calcium phosphate or magnesium pyrophosphate. In addition to the slightly water soluble suspending agents, there may be added a modifier such as sodium dodecylbenzene sulfonate. The amount of suspending agent added is 0.01 to 5% by weight based on the amount of water.

The vinyl aromatic monomer used may be styrene, alpha-methylstyrene, nuclear-methylstyrene, p-tert-butylstyrene, chlorostyrene, bromostyrene, and mixtures thereof. The catalysts used for polymerization of the vinyl aromatic monomers may be organic peroxides, such as benzoyl peroxide, tert-butyl perbenzoate, lauroyl peroxide and tert-butyl peroxide or azo compounds, such as azobisisobutyronitrile.

The vinyl aromatic monomer added to the suspension penetrates into the inside portion of the propylene-ethylene copolymer and is there polymerized in the copolymer. In this reaction, 20 to 60% by weight of the copolymer and 40 to 80% by weight of the vinyl aromatic monomer are used. When the amount of the vinyl aromatic monomer is less than 40% by weight, the expansion ratio of a resulting foamed structure decreases, and a foamed structure of low density cannot be obtained. Amounts of vinyl aromatic monomer greater than 80%, cause elasticity, thermal stability and oil resistance of the resulting foamed product to deteriorate.

The vinyl aromatic monomer and the polymerization catalysts may be added separately or as a solution of catalyst in the monomer. The two can be added all at once or, preferably in incremental portions to prevent too rapid polymerization rates. The monomer and catalyst can also be emulsified with suitable emulsifying agent and added to the suspension of copolymer resin as an emulsion.

The polypropylene-polyvinyl aromatic monomer interpolymer prepared by this process cannot be impregnated with blowing agent and expanded at 100° C. or less to produce low density (<2.0 pcf) fine cell structure foams. Temperatures of 110°-150° C. are necessary for foaming, which temperatures are not within the useable range for normal polystyrene foaming equipment.

To be able to process the interpolymers on low temperature equipment, one must viscbreak the interpolymers to a melt flow (Condition L) of greater than 10 and add a lubricant and cell control agent while maintaining orientation stress in the final product at a minimum.

Viscbreaking is the intentional chain scission of polypropylene to produce lower molecular weight, a more narrow molecular weight distribution, a slow crystallization rate and faster molecular relaxation time in the molten state. Viscbreaking can be accomplished by extrusion under high shear to mechanically degrade the higher molecular weight chains. More usually, viscbreaking is accomplished by extrusion in the presence of peroxides, as taught in U.S. Pat. No. 3,144,436, which is hereby incorporated in its entirety into this application. Thus, the polypropylene interpolymer is reacted in the essentially oxygen-free melt zone of an extruder with 0.005 to 0.5% based on interpolymer of a peroxide. The temperature in the extruder is determined by the polymer melting point (165° C. for polypropylene) and the particular peroxide used. The heating is preferably kept at a minimum for economic reasons.

The extrudate from the viscbreaking must be treated under conditions to minimize orientation stress in the particles. Fast quenching into water or other coolant maximizes stress, so slow cooling of the extruded strands under air or warm water is preferred. To further minimize stress in the product, an additive combination of lubricant and cell control agent is used. The lubricants may be various polymer additives, waxes, organic halogen flame retardant compounds, amides, amines and esters. Especially useful was ethylene bis-stearamide, alone or in conjunction with zinc stearate.

Impregnation of the viscbroken interpolymer is accomplished by suspending the interpolymer in water with the aid of a water-soluble suspending agent, such as polyvinyl alcohol, methocel or sodium dodecylbenzene sulfonate. Because the polypropylenes do not retain blowing agents well, the presence of polystyrene helps to retain the blowing agents. To ensure the retention of the blowing agents after impregnation, the polymer must be rapidly cooled. Use of inorganic phosphates as suspending agents requires acidification of the polymer and water washing. These take time and would encourage the escape of blowing agent.

The blowing agents suitable in the impregnation include aliphatic hydrocarbons such as butane, n-pentane, isopentane, n-hexane, and neopentane, cycloaliphatic hydrocarbons such as cyclopentane and halogenated hydrocarbons such as methyl chloride, ethyl chloride, methylene chloride, trichlorofluoromethane, dichlorodifluoromethane, etc. These blowing agents can be used alone or as mixtures of two or more thereof. The preferred amount of the blowing agent is in the range of 5 to 20% by weight based on the weight of the polypropylene-polyvinyl aromatic monomer interpolymer. If necessary, a solvent may be used, such as toluene or benzene.

The present invention is further illustrated in the following Examples in which all parts and percentages are by weight.

EXAMPLE I (a) Preparation of Polypropylene-polystyrene Interpolymer

To a 5.6 l. polymerization reactor, was added 2000 g. water, 9 g. magnesium pyrophosphate and 0.4 g of sodium dodecylbenzene sulfonate as suspending agents. Then 1000 g of polypropylene copolymer particles containing 4.2% by weight of ethylene copolymerized therein, and having a M.F. value of 3.0 and a melt peak of 126° C., were suspended in the aqueous medium. To the stirred suspension was added dropwise a solution of 10 g. of benzoyl peroxide and 1 g. of tert-butyl perbenzoate in 1000 g. of styrene monomer at a temperature of 85° C. The polymerization was carried out for 7 hours. After cooling, the reaction mixture was removed, acidified to remove suspending agents, and the polymer particles separated from the aqueous medium, washed with water and air dried. The polypropylene-polystyrene interpolymer thus recovered had a M.F. of 1.45 and a ratio of polypropylene to polystyrene of 46 to 54% by weight.

(b) Viscbreaking of Polypropylene-polystyrene Interpolymer

Various formulations were strand extruded in an MPM 1½" extruder at 171° C. through 0.125" die holes (drawdown was 64% of the die area) and slow cooled in air. Each formulation contained 100 parts of interpolymer from (a), 2.0 parts of ethylene bis-stearamide, 0.2 parts of zinc stearate, and the amounts of 1,3-bis(α-tert-butylperoxyisopropyl)benzene (Vulcup R peroxide from Hercules, Inc.) shown in Table I. The amount of viscbreaking is measured by the increase in M.F. (condition L) and is shown in Table I.

(c) Impregnation of Polypropylene-polystyrene Interpolymers

The samples of viscbroken interpolymers from (b) were impregnated with isopentane by charging to a series of 12 oz. crown cap bottles, 100 g. of interpolymer from (b), 100 g. water, 12.5 g. isopentane, 0.031 g. ethylene bis-stearamide, 0.031 g. sodium dodecylbenzene sulfonate and 2.5 g. toluene. The bottles were capped and heated to 60° C. and held at that temperature for 7 hours. The bottles were then cooled by chilling on ice, opened and the particles separated from the aqueous medium, and washed in a centrafuge.

The particles were then expanded at 100° C. to the densities given in Table I and cut open for visual determination of cell structure.

TABLE I

| Sample No. | Vulcup-R Level, % | M.F. Cond. L. | Expansion Time, sec. | Density, pcf. | Cell Structure |
|---|---|---|---|---|---|
| 1 | 0 | 4.1 | 75 | 6.3 | Large |
| 2 | 0.05 | 11.8 | 75 | 1.8 | Fine-med. |
| 3 | 0.075 | 17.0 | 70 | 1.55 | Fine |
| 4 | 0.10 | 21.6 | 60 | 1.50 | Fine |
| 5* | 0 | 12.6 | 75 | 1.4 | Fine-med. |

*Mechanically viscbroken by high shear mixing.

From the table, it can be seen that increased viscbreaking results in faster expansion time to optimum density and development of a finer cell structure. The mechanically viscbroken Sample 5 has a melt flow similar to the Sample viscbroken with 0.05% Vulcup-R. However, the expanded density of the sample is more similar to the higher melt flow samples which were viscbroken with 0.075% to 0.10% Vulcup-R.

Example II

To study the effect of varying amounts of lubricating and nucleating agents on the expandability, cell structure, and moldability of the polypropylene-polystyrene interpolymers (PPI), a series of formulations consisting of PPI (42% propylene/58% styrene), 0.1% Vulcup-R peroxide and the amounts of ethylene bis-stearamide (Acrawax C), and zinc stearate shown in Table II were viscbroken, impregnated, and expanded by the process of Sections (b) and (c) of Example I. Results are shown in Table II.

TABLE II

| Sample No. | ACRAWAX % | Zn Stearate % | Ep. Time sec. | Density pcf. | Cell Structure |
|---|---|---|---|---|---|
| 1 | 0 | 0 | 70 | 9.0 | Huge |
|   |   |   | 120 | 5.8 | Huge |
| 2 | 0 | 0.4 | 70 | 5.3 | Large-huge |
|   |   |   | 120 | 6.5 | Large-huge |

TABLE II-continued

| Sample No. | ACRAWAX % | Zn Stearate % | Ep. Time sec. | Density pcf. | Cell Structure |
|---|---|---|---|---|---|
| 3 | 2 | 0.2 | 60 | 1.40 | Med.-large |
|  |  |  | 70 | 1.25 | Med.-large |
|  |  |  | 80 | 1.13 | Med.-large |
| 4 | 3 | 0 | 60 | 1.26 | Fine-large |
|  |  |  | 70 | 1.09 | Fine-large |
|  |  |  | 80 | 1.02 | Fine-large |
| 5 | 4 | 0 | 40 | 1.76 | Fine-med. |
|  |  |  | 60 | 1.08 | Fine-med. |
|  |  |  | 70 | 1.10 | Fine-med. |
| 6 | 4 | 0.4 | 60 | 1.17 | Fine-large |
|  |  |  | 70 | 1.11 | Fine-large |
| 7 | 5 | 0 | 50 | 1.62 | Very fine center-lg. outsides |
|  |  |  | 70 | 1.51 |  |
|  |  |  | 80 | 1.45 |  |
| 8 | 7 | 0 | 70 | 7.5 |  |
|  |  |  | 120 | 7.7 |  |

Not shown in Table II is the fact that for runs 3 through 6, the moldings at fusion pressure of 20–22 psi and fusion times of 25–30 sec. gave mostly 100% fusion. Run 7 gave moldings having 50–80% fusion.

The Table II shows Acrawax C at a 2–4% addition level results in a uniform, relatively small cell, low density expansion in the range of 1–1.1 pcf. It also shows that zinc stearate by itself offers only a slight improvement in nucleation and expansion. Acrawax C, by itself, is a very effective nucleant and expansion aid and is just as effective as the Acrawax C-Zine Stearate in combination. In fact, the addition of zinc stearate to Acrawax C formulations results in a somewhat larger cell structure, increased heat sensitivity in molding and poor fusion.

As the level of Acrawax C is increased from 2 to 4%, a finer cell structure is evident and the time exposure in the Rodman to reach optimum density is somewhat reduced. Acrawax C levels above 4% results in a very fine cell structure prepuff with poor expansion qualities and high density. Higher levels of Acrawax C also results in a prepuff with poor molding characteristics as evidenced by high shrinkage, poor surface and poor fusion.

Changes in the PPI formulation or preparation techniques can result in a change in the optimum level of Acrawax C since expandability and cell structure is also directly related to degree of viscbreaking, molecular stress forces introduced during extrusion and pelletizing, and the lubricating effect of other additives such as other polymers, toluene and FR agents.

In the case of polypropylene interpolymer, it can be seen in Sample 1, Table I, that Acrawax C addition by itself will not result in a product that can be expanded into a moldable bead foam with good properties at low temperature (100° C.) Rodman conditions. The polypropylene must also be viscbroken and the molecular stress forces must be optimized during extrusion and pelletizing or through annealing during or after interpolymer preparation for a fine cell, low density expansion to occur.

EXAMPLE III

To show the importance of the polystyrene portion of the PPI, the following interpolymers were viscbroken by extrusion in the presence of 2% Acrawax-C and 0.075% Vulcup-R, impregnated as in Example Ic and expanded. The ideal expansion was in a Rodman expander at 100° C. When no expansion was noted under these conditions, higher temperatures were tried using a Unitex expander. Results are shown in Table III.

TABLE III

| % PP in PPI 2% Acrawax .075% Vulcup-R | Steam Res. PSI (Temp, °C.) | Time, sec. | Density, pcf | Cell Structure |
|---|---|---|---|---|
| 100 | 14.7 (100) | not expandable |  |  |
| 80 | 14.7 (100) | not expandable |  |  |
|  | 25 (130) | 60 | 6.3 | — |
|  | 35 (138) | 60 | 3.5 | Variable Very fine-Coarse |
| 64 | 14.7 (100) | not expandable |  |  |
|  | 15 (121) | 60 | 15.0 | — |
|  | 20 (126) | 60 | 6.5 | Very fine-Med. |
|  | 25 (130) | 60 | 3.4 | Fine-med. |
|  | 35 (138) | 60 | 2.4 | Med.-large |
| 50 | 14.7 (100) |  | <2.0 | Fine |
| 46 | 14.7 (100) | 70 | 1.55 | Fine |
| 42 | 14.7 (100) | 60 | 1.40 | Med.-large |
|  |  | 80 | 1.13 | Med.-large |
| 40 (no Acrawax-C) viscbroken mechanically 10 min. @ 166° C. in Brabender | 14.7 (100) | 30 | 1.76 | Fine |

It can be seen from the Table III, that as the polypropylene content is increased, a higher temperature is required for expansion. PPI formulations containing 40–60% polypropylene expand easily to a low density in a Rodman expander at 100° C. However, if the polypropylene content is increased much beyond 60%, expansion in the Rodman expander at 100° C. will not be possible.

EXAMPLE IV

To study the effect of ethylene content in the initial polypropylene copolymer on the PPI copolymer, three base polypropylene copolymers were chosen: A, 4.7% ethylene content, peak melting point 126.2° C.; B, 4.2% ethylene content, peak melting point 129.6° C., 3.5% ethylene content, peak melting point 137° C.

A 42% polypropylene-58% polystyrene interpolymer was produced from each of the three base resins and each was viscbroken with 0.1% Vulcup-R peroxide and 2% Acrawax C and 0.2% zinc stearate were added and extruded at 171° C. melt temperature, low drawdown and slow air cool on the 1⅜" MPM strand extrusion line through 0.125" diameter holes. All three PPI were impregnated with 12.5% isopentane and 2.5% toluene in bottles. Foaming results are shown in Table IV for pre-puff made at 100° C. in a Rodman expander.

TABLE IV

| Base PP | Peak M.P., °C. | Expansion Time, sec. | Density, pcf. | Cell Structure |
|---|---|---|---|---|
| A | 126 | 60 | 1.40 | Med.-large |
|  |  | 70 | 1.25 | Med.-large |
|  |  | 80 | 1.13 | Med.-large |
| B | 129.6 | 75 | 1.25 | X-large |
|  |  | 90 | 1.18 | X-large |
| C | 137 | 120 | 1.90 | Med.-X-lg. |
|  |  | 150 | 1.40 | Med.-X-lg. |

As can be seen from the Table IV, the expansion time in the Rodman to reach low density increases as the melting peak of the base polypropylene copolymer increased. Thus, the PPI made from the higher melting PP, C, does not expand to as low a density as the lower melting, A and B, even in twice the expansion time.

EXAMPLE V

To illustrate the need to minimize orientation stresses during extrusion and pelletization of the interpolymer to obtain a low density, fine cell structure foam, several preparation conditions prior to impregnation of the particles were studied. Results are shown in Table V.

TABLE V

| Sample No. | Preparation Conditions | Expansion time, sec. | Cell Structure | Density, pcf. |
|---|---|---|---|---|
| A | Slow cool grinds | 30 | Very fine | 1.76 |
| B | Water quenched extruded strand | 180 | Med.-large | 2.2 |
| C | Slow air cool strand Min. drawdown | 70 | Fine-Med. | 1.24 |
| D | Fast. cold water quench - intermed drawdown | 60 | Fine-med.-large | 1.54 |
| E | Fast cold water quench-hi drawdown | 90 | Med.-X-large | 10+ |
| F | Air cool, 77% drawdown | 90 | Med.-large | 2.1 |
| G | Air cool 105% drawdown 12.5% iso-pentane | 50 | Fine | 1.54 |
| H | Air cool 105% drawdown 15% isopentane | 60 | Fine | 1.19 |
| I | 48° C. water quench 200% drawdown | 90 | Fine-large | 1.65 |

Samples A and B were interpolymers of 40% polypropylene and 60% polystyrene blended with 2% Acrawax-C and 0.2% zinc stearate. Sample A was intensively mixed in a Brabender mixer, allowed to cool in a blob, and then ground prior to impregnation. This method of preparation results in an almost molecular stress-free grind since there is very little orientation stress after mixing and slow cooling in large blobs maximizes molecular relaxation. Expansion of these formulations results in a very uniform fine cell, low density prepuff in a relatively short 30 sec. Rodman expansion time. When these same formulations in Sample B, are Bolling mixed, ground and then strand extruded (218° C. melt) and pelletized with cool water quench, the expanded prepuff has a large cell structure and requires 3 to 6 times longer in the Rodman expander to reach optimum density.

The remaining samples, C-I, were interpolymers of 46% polypropylene and 54% polystyrene blended with 2.5% Acrawax C, 0.25% zinc stearate, and 0.075% Vulcup-R (except Sample D had 0.25% Vulcup-R). Samples C-E were extruded in a 1½" MPM lab extruder with 0.125" diameter die holes. The improved expandability, lower density and finer cell structure of Sample D compared with the high drawdown Sample E is a result of the higher viscbreaking (faster melt stress relaxation) as well as the reduced strand drawdown.

Optimization of molecular orientation stress development in PPI formulations prior to expansion is extremely important since the molecular stress level influences expandability (expansion time), cell structure, and the outer skin thickness of the prepuff. The prepuff morphology in turn is directly related to fusion and shrinkage during molding. PPI formulations processed at the optimum extrusion slow cool conditions produce a prepuff with a fine cell structure in the center with the cell becoming larger towards the outside. A thin outer skin is also apparent at these conditions. The cells are finer in the center of the prepuff because the polymer melt cools more slowly, allowing more time for molecular stress relaxation. Prepuff produced at these optimum conditions molds well with good fusion and little shrinkage.

Samples F-I were extruded on an Egan 1½" extruder through a strand die with 0.0625" diameter holes and show the effect of drawdown with slow air cool and 48.8° C. water quench on expandability and cell structure.

The percent drawdown of the samples was calculated from the formula:

$$\% \text{ Drawdown} = \frac{\text{Cross-sectional area of extruded strand}}{\text{Cross-sectional area of die hole}} \times 100$$

We claim:
1. A process for producing expandable polypropylene particles comprising
   (a) suspending in an aqueous medium, a copolymer of propylene and sufficient olefin comonomers to give said copolymer a melting peak of less than 140° C., with the aid of a suitable suspending agent system;
   (b) adding to said suspension vinyl aromatic monomer and a catalyst system such that the amount of monomer is 40 to 80% by weight based on copolymer plus monomer;
   (c) polymerizing said monomer in the interior of said copolymer to form a polypropylene-polyvinylaromatic monomer interpolymer;
   (d) separating said interpolymer from said suspension by acidifying, filtering, washing with water and drying in air;
   (e) extruding said interpolymer in admixture with a lubricant and cell control agent and a peroxide, if used, to viscbreak said interpolymer to a melt flow (condition L) of at least 10, under conditions to minimize orientation stress in the final extrudate;
   (f) impregnating said extrudate with a blowing agent to give expandable polypropylene-polyvinyl aromatic monomer interpolymers which can be expanded at 100° C. to fine cell structure foams of density less than 2.0 pounds per cubic foot.

2. The process of claim 1 wherein said olefin comonomer may be ethylene.

3. The process of claim 1 wherein said olefin comonomers may be ethylene and butene.

4. The process of claim 1 wherein said vinyl aromatic monomer is at least one monomer selected from the group consisting of styrene, alpha-methylstyrene, nuclearmethylstyrene, p-tert-butylstyrene, chlorostyrene, bromostyrene, and mixtures thereof.

5. The process of claim 1 wherein said vinyl aromatic monomer and catalysts are added as an emulsion of monomer and catalysts in water.

6. The process of claim 1 wherein said vinyl aromatic monomer and catalysts are added as a solution of catalyst in monomer.

7. The process of claim 1 wherein said lubricant and cell control agent is 2-4% by weight ethylene-bis-stearamide based on interpolymer.

8. The process of claim 1 wherein said lubricant and cell control agent is 2-4% by weight ethylene-bis-stearamide and 0.2-0.4% by weight zinc stearate based on interpolymer.

9. The process of claim 1 wherein said conditions to minimize orientation stress comprise slow air cool of the extrudate.

10. The process of claim 1 wherein said conditions to minimize orientation stress comprise cooling in a blob followed by grinding to small particles.

11. The process of claim 1 wherein said conditions to minimize orientation stress comprise slow cool with warm water.

12. The process of claim 1 wherein said blowing agent is selected from the group consisting of aliphatic hydrocarbons, cycloaliphatic hydrocarbons, and halogenated hydrocarbons.

* * * * *